(12) United States Patent
Hart et al.

(10) Patent No.: US 9,409,780 B2
(45) Date of Patent: Aug. 9, 2016

(54) NANOSTRUCTURES PATTERNED BY ELECTROSTATIC PRINTING

(71) Applicant: The Regents of The University of Michigan, Ann Arbor, MI (US)

(72) Inventors: Anastasios John Hart, Somerville, MA (US); Erik Polsen, New Baltimore, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 14/090,746

(22) Filed: Nov. 26, 2013

(65) Prior Publication Data

US 2014/0147372 A1     May 29, 2014

Related U.S. Application Data

(60) Provisional application No. 61/729,938, filed on Nov. 26, 2012.

(51) Int. Cl.
*C01B 31/02* (2006.01)
*C01B 31/00* (2006.01)
(Continued)

(52) U.S. Cl.
CPC .............. *C01B 31/0233* (2013.01); *B82Y 30/00* (2013.01); *B82Y 40/00* (2013.01); *C01B 31/024* (2013.01); *C01B 2202/08* (2013.01)

(58) Field of Classification Search
CPC .......... B82Y 30/00; B82Y 40/00; B82Y 5/00; B82Y 10/00; B82Y 15/00; B82Y 20/00; B82Y 25/00; B82Y 35/00; B82Y 99/00; C01B 31/024; C01B 31/0233; C01B 2202/08; C01B 31/022; C01B 31/0226; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2022/36; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ........ 423/447.1–447.3, 445 B; 977/742–754, 977/842–848
See application file for complete search history.

(56) References Cited

U.S. PATENT DOCUMENTS

2002/0178846 A1 * 12/2002 Dai et al. ..................... 73/866.5
2010/0244262 A1 *  9/2010 Awano et al. ................. 257/758

FOREIGN PATENT DOCUMENTS

WO    WO 2008/153609    * 12/2008 .............. C01B 31/02

OTHER PUBLICATIONS

Mansoor, et al., Inkjet Printing of Catalyst-Inks on Si Wafers and the Subsequent Synthesis of Carbon Nanotubes by Chemical Vapour Deposition, Key Engineering Materials 2010; 442: 7-14.*
(Continued)

*Primary Examiner* — Daniel C McCracken
(74) *Attorney, Agent, or Firm* — Reising Ethington P.C.

(57) ABSTRACT

An electrostatic printing method such as laser printing can be employed for cost-effective and scalable patterning of nanostructure growth catalysts onto growth substrates, either directly or via one or more transfer substrates. Particles comprising a nanostructure growth catalyst are deposited onto the substrate in an electrostatically defined growth pattern. Another aspect of the method includes pressing a mixture of a nanostructure growth catalyst and a binder against the substrate to bond the mixture to the substrate. Nanostructures are grown from the deposited pattern in known nanostructure growth environments. The method allows a user to define a nanostructure growth pattern using familiar, user-friendly computer programs such as word processors, CAD, or other graphics software. Carbon nanotube forests can be grown from magnetic ink character recognition (MICR) toner printed on or transferred to the substrate.

16 Claims, 13 Drawing Sheets

(51) Int. Cl.
    *B82Y 30/00*     (2011.01)
    *B82Y 40/00*     (2011.01)

(56) References Cited

OTHER PUBLICATIONS

C. R. Barry et al., "Printing Nanoparticles from the Liquid and Gas Phases Using Nanoxerography," Nanotechnology, vol. 14, No. 10, pp. 1057-1063, Oct. 2003.

W. K. T. Coltro et al., "A Toner-Mediated Lithographic Technology for Rapid Prototyping of Glass Microchannels," Lab on a chip, vol. 7, No. 7, pp. 931-934, 2007.

E. Carrilho et al., "Understanding Waxprinting: A Simple Micropatterning Process for Paper-Based Microfluidics," Analytical chemistry, vol. 81, No. 16, pp. 7091-7095, Aug. 2009.

A. Tan et al., "Rapid Fabrication of Microfluidic Devices in Poly (Dimethylsiloxane) by Photocopying," Lab on a Chip, vol. 1, pp. 7-9, 2001.

W. K. T. Coltro et al., "Toner and Paper-Based Fabrication Techniques for Microfluidic Applications," Electrophoresis, vol. 31, No. 15, pp. 2487-2498, Jul. 2010.

M. Bedewy et al., "Collective Mechanism for the Evolution and Self-Termination of Vertically Aligned Carbon Nanotube Growth," The Journal of Physical Chemistry C, vol. 113, No. 48, pp. 20576-20582, Dec. 2009.

L. Ge et al., "Carbon Nanotube-Based Synthetic Gecko Tapes," Proceedings of the National Academy of Sciences of the United States of America, vol. 104, No. 26, pp. 10792-10795, Jun. 26, 2007.

L. Qu et al., "Carbon Nanotube Arrays with Strong Shear Binding-On and Easy Normal Lifting-Off," Science, vol. 322, October, pp. 238-242, 2008.

\* cited by examiner ized particles having their largest dimension on the nanoscale (i.e., having all three Cartesian dimensions in the nanoscale).

NANOSTRUCTURES PATTERNED BY ELECTROSTATIC PRINTING

This application claims the benefit of U.S. Provisional Application No. 61/729,938, filed Nov. 26, 2012, the entire contents of which are hereby incorporated by reference.

TECHNICAL FIELD

This disclosure relates generally to nanostructures and methods of producing nanostructures.

BACKGROUND

Methods for growing nanostructures such as carbon nanotubes (CNTs) from catalyst nanoparticles are known. While nanostructures such as CNTs have been proposed for widespread use in electronics, composite materials, and other applications, producing nanostructures on a scale large enough for commercialization has not been realized. This is due in part to the limited techniques available to deposit catalyst materials onto nanostructure growth substrates. Methods such as sputtering or electron-beam deposition combined with photolithography can be costly, requiring large capital investment in equipment and clean room facilities. In addition, such techniques have been primarily developed for the semiconductor industry, where the size scale is on the order of a few inches, and are not easily scaled up to higher volume production.

SUMMARY

In accordance with one or more embodiments, a method includes the step of depositing particles comprising a nanostructure catalyst onto a substrate in an electrostatically defined growth pattern.

In accordance with one or more embodiments, a method includes the steps of: (a) pressing a mixture comprising a nanostructure catalyst and a binder against a substrate to bond the mixture to the substrate; and (b) growing nanostructures from the mixture.

In accordance with one or more embodiments, a nanostructure growth substrate includes compressed particles bonded to a surface of the growth substrate. The particles include a nanostructure catalyst and an organic binder.

BRIEF DESCRIPTION OF THE DRAWINGS

Preferred exemplary embodiments will hereinafter be described in conjunction with the appended drawings, wherein like designations denote like elements, and wherein.

DESCRIPTION OF THE ILLUSTRATED EMBODIMENTS

An electrostatic printing method such as laser printing can be employed as described below for cost-effective and scalable patterning of nanostructure growth catalysts onto growth substrates, either directly or via one or more transfer substrates. This method allows a user to define a nanostructure growth pattern using familiar, user-friendly computer programs such as word processors, CAD, or other graphics software. The method is demonstrated in the following disclosure through the use of a laser printer equipped with a commercially available toner used to print checks and other financial documents that rely on magnetic ink character recognition (MICR). The laser printing embodiments described below are only examples of the method, and it will be understood from these teachings that other devices may be capable of electrostatic patterning and/or bonding catalyst-containing materials to a substrate for subsequent nanostructure growth. Nanostructures of the type contemplated herein are structures having two dimensions in the nanoscale, such as elongate structures having a diameter or plural cross-sectional dimensions within the general range of 0.1 to 100 nanometers. This includes, for example, nanotubes, nanowires, nanorods, nanocolumns, and nanofibers. Nanoparticles are particles having their largest dimension on the nanoscale (i.e., having all three Cartesian dimensions in the nanoscale).

Figure 1:
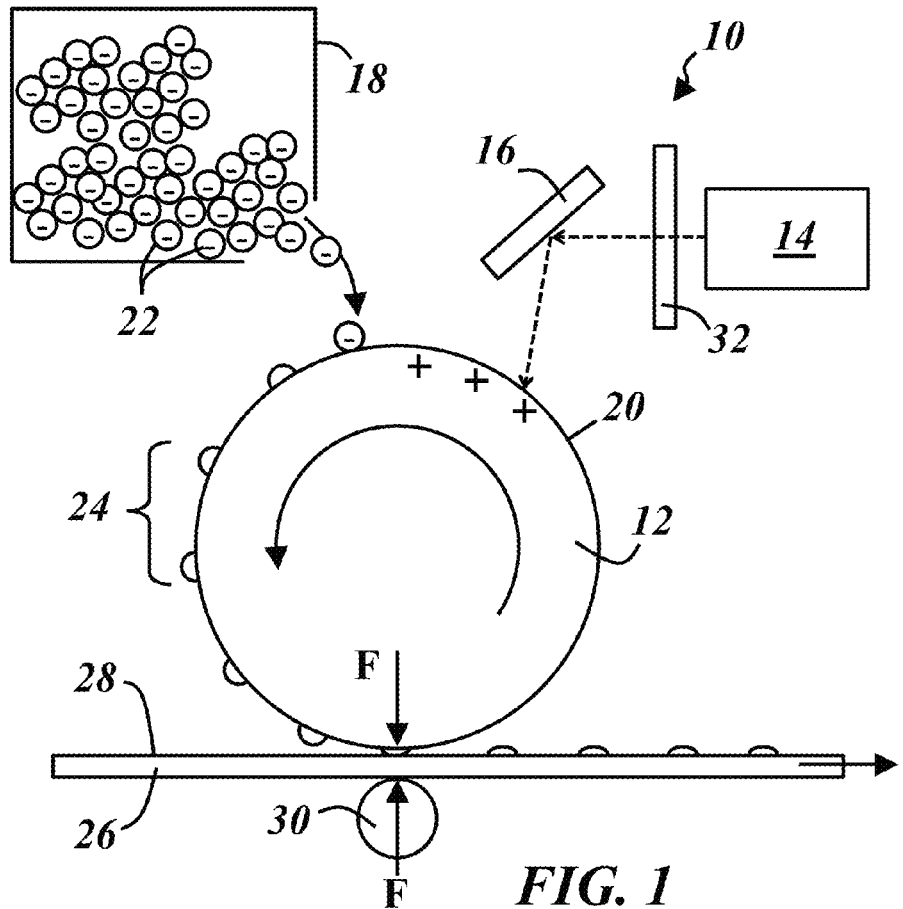
FIG. 1 is a schematic view of laser printer components.

In one embodiment, the method comprises depositing particles comprising a nanostructure growth catalyst onto a substrate in an electrostatically defined growth pattern. In another embodiment, the method comprises pressing a mixture comprising a nanostructure growth catalyst and a binder against a substrate to bond the mixture to the substrate. The electrostatic printing process shown in FIG. 1 may be used with either or both embodiments. FIG. 1 schematically illustrates the operation of an electrostatic printer 10, such as a commercially available laser printer. The printer includes a drum or roller 12, a light source 14, a reflector 16, and a toner or ink cartridge 18. In this example, light from the light source 14 is directed at the rotating drum 12 via the reflector 16, and a static charge is imparted to an outer surface 20 of the drum wherever it is exposed to the light. Toner or ink particles 22 stored in the cartridge 18 are deposited along the drum surface 20 and are attracted to the charged pattern imparted to the drum by the light from the light source 14, leaving the uncharged areas of the drum surface 20 free from the particles 22. The portion of the drum 12 with the electrostatically defined pattern 24 of particles 22 is then brought into contact with a substrate 26 having a surface 28 that moves along with the outer surface 20 of the drum 12. The particles 22 are pressed against the substrate where the drum 12 and substrate 26 are forced against each other with an applied force F. The substrate 26 may be supported by an additional roller 30 or other support. One or both of the drum 12 or substrate 26 may be heated, and the particles 22 are transferred and bonded to the substrate in the same pattern 24.

As used herein, an electrostatically defined growth pattern is defined as follows. A growth pattern is any arrangement of dots, lines, or shapes along which nanostructures are grown or are intended to be grown. As such, the growth pattern may exist on a substrate, on one or more drums of a laser printer, as a user-viewable image, or elsewhere. "Electrostatically defined" means that at some time prior to nanostructure growth, the growth pattern exists in the form of an electrostatic charge differential on a component surface. The charge differential is with respect to the charge at other areas of the same surface away from the pattern and/or with respect to the particles to be deposited. In FIG. 1, for example, the electrostatically defined pattern is present in the form of a charge on the otherwise uncharged drum surface 20 wherever the surface is exposed to light from the light source 14. The electrostatically defined growth pattern may subsequently manifest itself in the form of particles 22 attracted to the drum surface 20, particles deposited and/or pressed against a substrate surface, and/or as nanostructure forests. In all cases, the growth pattern has been electrostatically defined and subsequently assumed different forms. The pattern 24 as deposited on the substrate 26 may be a mirror image of the pattern originally defined on the drum surface 20, but for purposes of this disclosure, they are considered the same pattern.

In the illustrated example, the printer 10 is a laser printer. The light source 14 may be an infrared (IR) laser diode or other laser light source. The reflector 16 moves to direct the light from the laser light source to the desired locations along the drum surface 20 as the drum rotates. This example also includes an optional filter 32 that can be used to decrease the intensity of the laser light or otherwise change the properties of the light passing therethrough. Other types of electrostatic printers may include other types of light sources and/or may change the charge along the drum surface 20 in some other manner. In one embodiment, the printer 10 is an LED printer in which the light source 14 includes an array of LED lights that are selectively illuminated as the drum surface 20 passes by to selectively alter the charge along the drum surface. It is contemplated that other techniques may be used to alter the electric charge along the drum surface to attract or repel particles comprising the nanostructure catalysts. In another example, the entire drum surface 20 is electrically charged and the light source acts to selectively neutralize the surface in a particular pattern. In yet another example, the light source 14 directs light directly along the substrate surface 28 to selectively alter the electrical charge in a pattern, and the particles 22 are subsequently deposited along the substrate surface and attracted to oppositely charged areas that make up the pattern. Where the particles 22 include nanostructure catalyst, these are all examples of electrostatically defining a nanostructure growth pattern 24.

The toner particles 22 include a nanostructure growth catalyst, also referred to as a nanostructure catalyst. The nanostructure catalyst is selected for use in a particular nanostructure growth environment to produce the desired nanostructures. Each toner particle 22 may include one type of nanostructure catalyst or a mixture of more than one type of catalyst. Some examples of nanostructure catalysts include iron, cobalt, nickel, and gold. The particles 22 may include any combination of these and/or other nanostructure catalysts. One example of a suitable particle composition comprises iron in the form of iron oxide. An iron-based catalyst may be used to catalyze the growth of CNTs. The particles 22 may each include a mixture including the nanostructure catalyst and a binder material. The binder material is any material capable of binding multiple catalyst particles together in the larger particles 22. The binder may also facilitate bonding of the particles 22 with the substrate 26 by deforming and/or softening while being pressed against the substrate. Suitable binders include organic materials such as wax or polymer materials. The particles 22 may include other materials to make them suitable for use in printing processes or for other reasons, such as to influence nanostructure growth. In one example, the particles 22 comprise a transition metal oxide such as aluminum oxide, or catalyst-containing particles may be mixed with transition metal oxide-containing particles. The cartridge 18 may be filled with a mixture of particles 22 including nanostructure catalyst and other particles that do not include nanostructure catalyst.

The substrate 26 may be any suitable material, depending somewhat on subsequent method steps performed therewith. For example, the substrate 26 may be a growth substrate that can be placed directly into a nanostructure growth environment after catalyst deposition so that nanostructures can be grown from the deposited particles. In high temperature growth processes, metal foils or other non-polymer substrates may be preferred. While conventional electrostatic printing processes typically require flexible substrates that can wind through a series of relatively small rollers, the process can be adapted to deposit catalyst directly onto more rigid and relatively flat surfaces, as well as thin sheets of stiff materials such as metals or ceramics, which can be flexible. In some lower-temperature nanostructure growth environments, the substrate 26 may be a polymer-based growth substrate.

In another embodiment, the substrate 26 is a transfer substrate. A transfer substrate is any substrate from which catalyst-containing material is transferred to another substrate. As will be outlined in further detail by way of example, the particles 22 may first be deposited onto a flexible transfer substrate by electrostatic printing. At least a portion of the particles 22 may then be transferred to a different growth substrate suitable for the particular nanostructure growth environment. Embodiments that employ a flexible transfer substrate can thus utilize commercially available printing devices, such as laser printers, for deposition of the nanostructure catalyst or catalyst-containing particles, with subsequent transfer of the catalyst to another substrate that can withstand higher temperature nanostructure growth environments.

Figure 2:
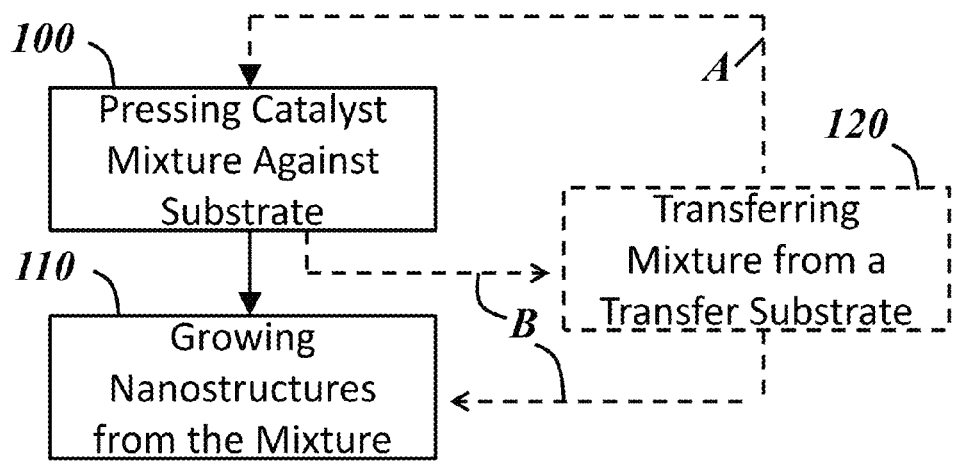
FIG. 2 is a process flow diagram encompassing multiple embodiments of the method described herein.

FIG. 2 is a process flow diagram that encompasses multiple embodiments of the deposition process. In the illustrated example, the process generally includes the step of pressing a mixture comprising the nanostructure catalyst and binder against a substrate to bond the mixture to the substrate (step 100), followed by the step of growing nanostructures from the mixture (step 110). The process includes the optional step of transferring at least a portion of the mixture from a transfer substrate to a different substrate (step 120), which may be performed before or after step 100 as follows. In one example, the substrate of step 100 is a growth substrate, and step 100 may be performed by a printer (as in FIG. 1) so that the catalyst-containing mixture is deposited onto and pressed against the growth substrate at the same time. In this case, step 120 is omitted. In another example, the substrate of step 100 is a growth substrate, and step 100 includes transferring the catalyst-containing mixture from a separately prepared transfer substrate to the growth substrate by pressing the substrates together. In this case, step 120 is included before step 100 (variation A of FIG. 2). In another example, the substrate of step 100 is a transfer substrate, and step 120 is included between steps 100 and 110 (variation B of FIG. 2). Thus, the process may include more than one pressing step—one in which the mixture is pressed against the transfer substrate for deposition thereon, and one in which the transfer substrate is pressed against a separate growth substrate. In other words, step 100 may occur multiple times during any particular version of the method, depending on the number of transfer steps.

Figure 3:
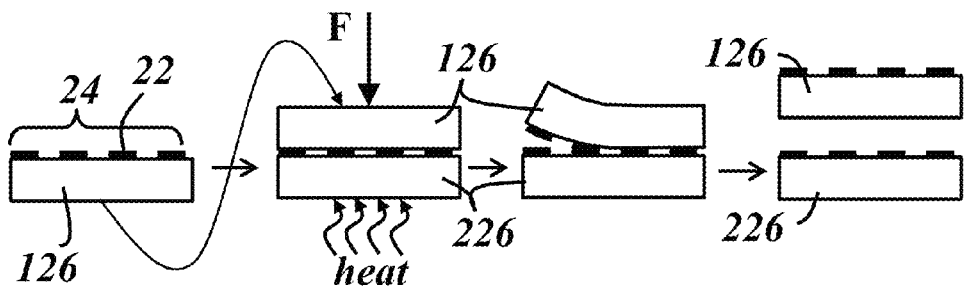
FIG. 3 is a schematic representation of an embodiment of a transfer process.

In one embodiment, the catalyst-containing particles are first deposited onto a transfer substrate and only a portion of the particles are then transferred to the growth substrate from the transfer substrate. In this manner, a transfer substrate can be configured for use as a catalyst stamp and used multiple times to transfer catalyst to multiple separate growth substrates in the same desired growth pattern. FIG. 3 illustrates one embodiment, where the transfer substrate is designated 126 and the growth substrate is designated 226. FIG. 3 shows the catalyst-containing particles 22 deposited onto the transfer substrate 126 in a pattern 24. The transfer substrate 126 is then pressed against a separate growth substrate 226 with an applied force F with the catalyst facing the growth substrate. Heat is applied to facilitate transfer. Where a binder is present in the deposited particles 22, the heat can help soften the binder to facilitate transfer. The transfer substrate 126 is then separated from the growth substrate 226, in this case by peeling the substrates apart. Only a portion of the deposited material is transferred to the growth substrate 226, and the transfer substrate 126 can be used again to transfer more of the catalyst onto a different growth substrate.

Figure 4A:
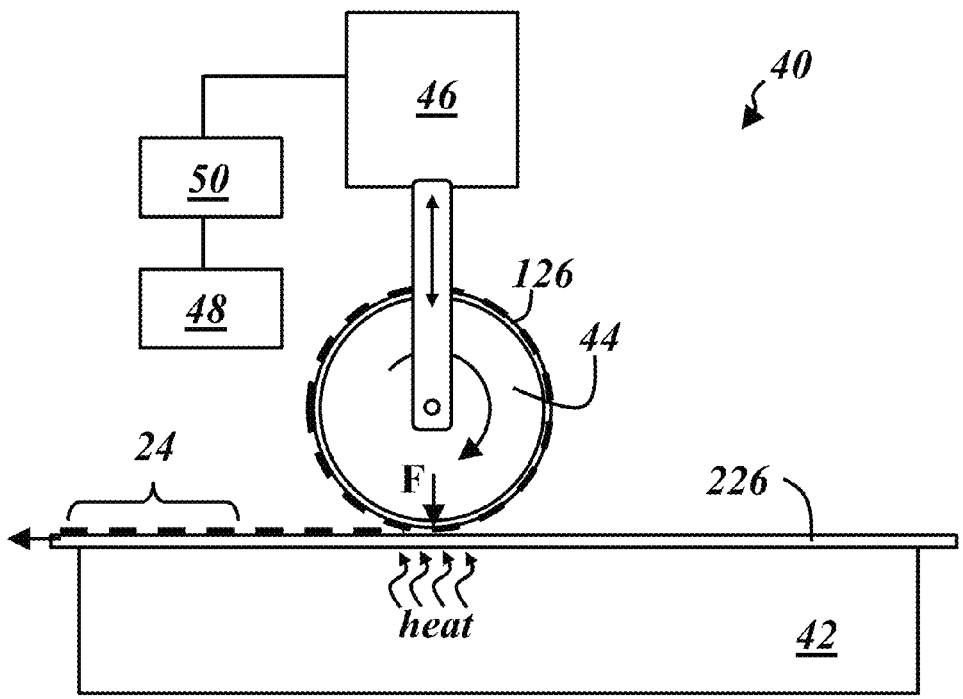
FIG. 4A is a schematic view of an embodiment of a nanostructure catalyst deposition device.

FIG. 4A illustrates one embodiment of a transfer process performed by a nanostructure catalyst deposition device 40. The illustrated deposition device 40 is similar to the above-described printer in some respects except that it does not include a component for changing the electrostatic charge of any surfaces. The device 40 is configured to transfer the catalyst pattern 24 from a transfer substrate 126 to a growth substrate 226. The illustrated device 40 includes a growth substrate support component 42, a transfer substrate support component 44, an actuator 46, one or more sensor(s) 48, and a controller 50. The growth substrate support component 42 is adapted to support the nanostructure growth substrate 226, and the transfer substrate support component 44 is adapted to support the transfer substrate 126. At least one of the support components 42, 44 is generally cylindrical and at least one of the support components is heated. In this example, the transfer substrate support component 44 is a roller and the growth substrate support component 42 is heated. The transfer substrate 126, which may have nanostructure catalyst deposited along its surface in a pattern 24 according to the above-described method, is affixed to the roller 44. The transfer substrate 126 in this case may be a flexible polymer substrate such as a polyethylene (e.g. HDPE) or polyimide film.

The roller 44 is interconnected with the actuator 46, which is adapted to control vertical movement of the roller and thus the applied force F. The sensor(s) 48 may include a temperature sensor, a force sensor, or any combination of sensors. The controller 50 receives information from the sensor(s) 48 and can change one or more process conditions in response to the information. In one embodiment, the device 40 includes a temperature sensor that provides information about the temperature of the growth substrate support component 42 and/or the growth substrate 226 to the controller, and the controller controls a heater to change the monitored temperature if necessary. In this manner, the sensor 48 and the controller 50 may work together to maintain the support component 42 at the desired temperature. In another embodiment, the device 40 includes a sensor that provides information about the applied force F at the interface of the support components to the controller, and the controller controls the actuator 46 to change the applied force F if necessary. The sensor 48 in this case can be a strain gauge located along either of the support components 42, 44 or along a member extending from and/or attached to the actuator 46. In this manner, the sensor 48 and the controller 50 work together to maintain a desired applied force F. The device may include both a temperature sensor and a force sensor or gauge, along with other types of sensors. In this example, the actuator 46 remains in a fixed lateral position as the growth substrate 226 moves beneath the rotating roller 44. As noted above, only a portion of the catalyst-containing material may be transferred to the growth substrate 226 from the transfer substrate 126, and the roller 44 may thus rotate multiple times to transfer the pattern 24 of catalyst material to the same growth substrate at multiple locations along its surface. The illustrated example is non-limiting, as either or both of the substrate supports 42, 44 could be a roller and either or both substrate supports could be heated.

Figure 4B:
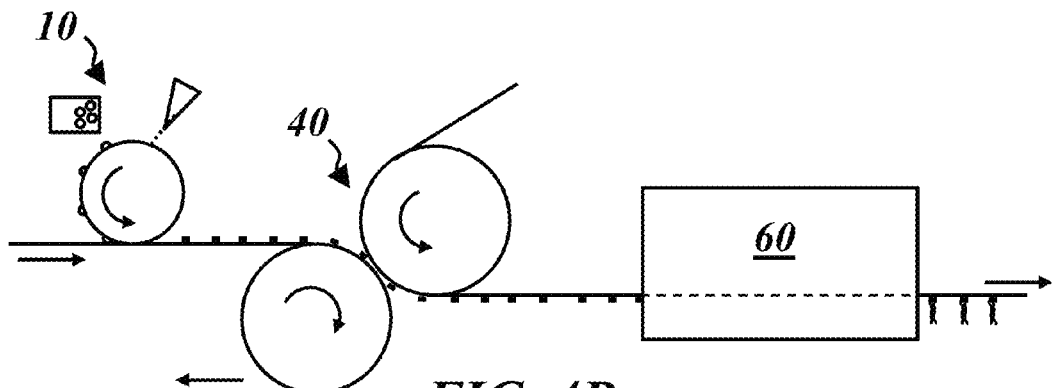
FIG. 4B is a schematic view of a continuous nanostructure manufacturing process.

A continuous nanostructure manufacturing process is shown schematically in FIG. 4B, including an electrostatic deposition device 10, a nanostructure catalyst deposition device 40, and a nanostructure growth device 60. Device 10 may be a laser printer such as that of FIG. 1, where a light source is used to electrostatically define the desired growth pattern on a photosensitive drum and catalyst-containing toner particles are attracted to the pattern for deposition on the substrate 26. In this example, the substrate is a transfer substrate, and catalyst is transferred to a different, separately provided substrate by device 40, which continues through a nanostructure growth environment in device 60. This is of course only one example of a continuous process in which the desired nanostructure growth pattern is electrostatically defined. In another embodiment, the printed substrate 26 continues directly to the growth device 60 with no transfer step.

Experimental Example

As a proof-of-concept example, laser printing equipment was used with MICR toner to electrostatically define the nanostructure growth pattern on the substrate. MICR toner is a commercially available toner used to print checks and other documents so that the printing is machine-readable by magnetic means. MICR toner includes iron oxide nanoparticles that can serve as a carbon nanotube (CNT) growth catalyst. Laser printing was performed on flexible polymer films, and the deposited toner was transferred to a rigid growth substrate under heat and mechanical pressure. Vertically-aligned CNT forests were grown on the growth substrate under typical $C_2H_4$ chemical vapor deposition (CVD) conditions. As described below, CNT density can be controlled by the intensity of the laser used to alter the charge on the printer drum surface and/or by grayscale pixilation. The minimum feature size with the particular standard office printer used in the experiments was about 70 μm (one grayscale dot); however, significantly smaller features are possible with appropriate control of the electrostatic printing process and design of the toner particles. In principle, features as small as individual nanostructure growth particles could be printed. The present example demonstrates that virtually any nanostructure growth pattern can be designed using standard software (e.g. Microsoft Word, AutoCAD, etc.), with the catalyst pattern printed on-demand. Basic applications, including large-area patterning and dry-adhesive properties, were also studied. Based on SAXS, SEM and TEM analysis, CNT forests grown from laser printed catalyst have comparable CNT diameter, alignment, and density with CNTs grown from conventionally deposited catalysts. The described process enables high-speed micro-patterning of nanostructure catalysts under ambient conditions with the option to transfer the catalysts to any desirable growth substrate.

Figure 5:
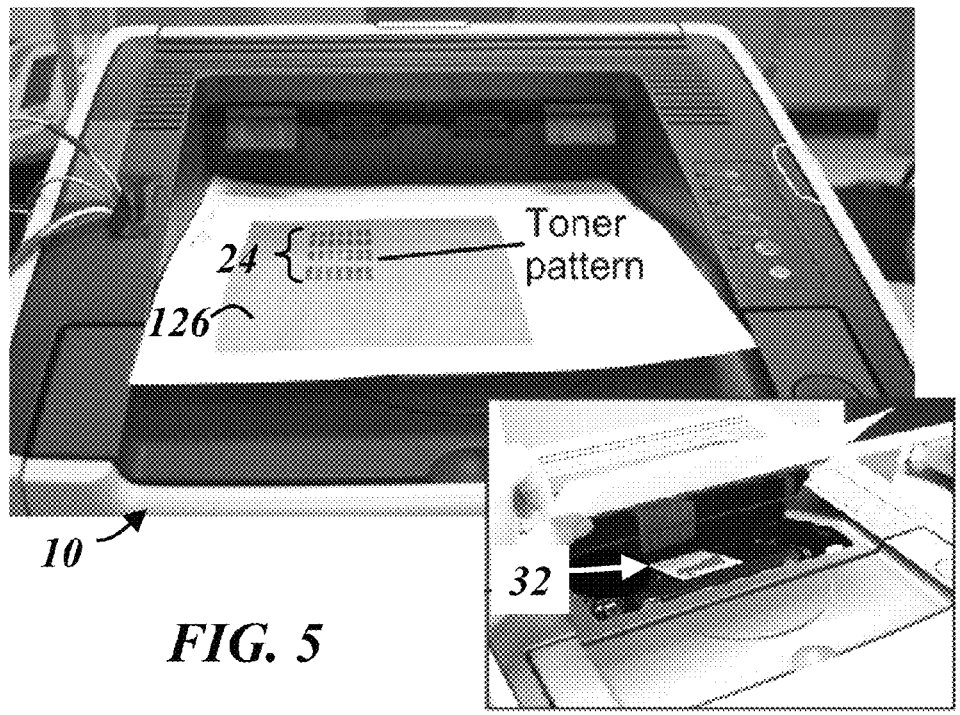
FIG. 5 includes photographic images of a laser printer used to deposit catalyst-containing particles onto a transfer substrate.

The overall process for printing the MICR toner for CNT growth included user-definition of the desired growth pattern and printing of the pattern on a flexible polymer substrate using a modified laser printer. Patterns used in this example were drawn using AutoCAD or SolidWorks software to enable a precise baseline measurement of the desired pattern with which to gauge printer accuracy and toner flow control during the printing process. For increased contrast, commercially available laser printers deposit relatively large amounts of toner on the substrate (usually paper). For purposes of catalyst deposition, it was desired to deposit less toner than is used in typical laser document printing so that the number of layers of catalyst particles would be minimized. With reference again to FIG. 1, a 50% transmission neutral density filter 32 was installed between the laser diode 14 and the photosensitive drum 12 to reduce the magnitude of the electrostatic charge imparted to the drum surface 20, thereby reducing the number of toner particles 22 attracted to the drum surface. Various patterns were printed onto 50 μm-thick Kapton polyimide films using a Hewlett Packard 2015DN laser printer with Thorlabs neutral density filters. Each sheet of film was mounted to a 22-lb sheet of paper backing with adhesive tape around the perimeter of the film and fed through the printer. FIG. 5 includes a photograph of the laser printer 10, shown with the Kapton substrate 126 after the substrate was fed through the printer for printing of the electrostatically defined (and user-defined) pattern 24. In the lower right-hand inset of FIG. 5, the printer 10 is shown with a cover of the printer open and with the location of the light filter 32 generally indicated. In this example, the Kapton sheet acted as a transfer substrate (see FIG. 3), but in other embodiments, the printed sheet is a growth substrate.

Figure 6:
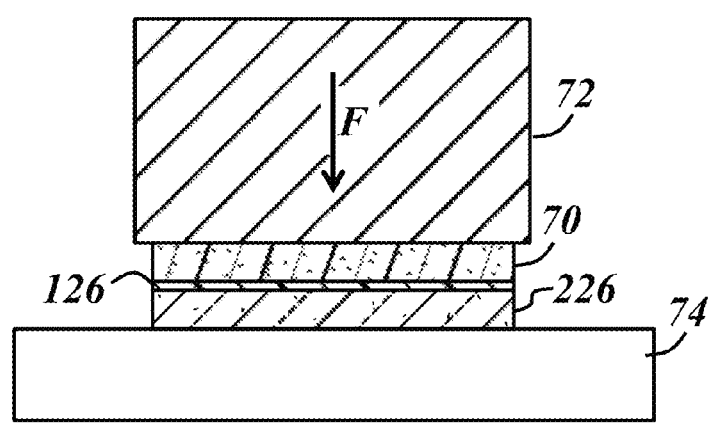
FIG. 6 is a cross-sectional view of an embodiment of a transfer process set-up.
Figure 7:
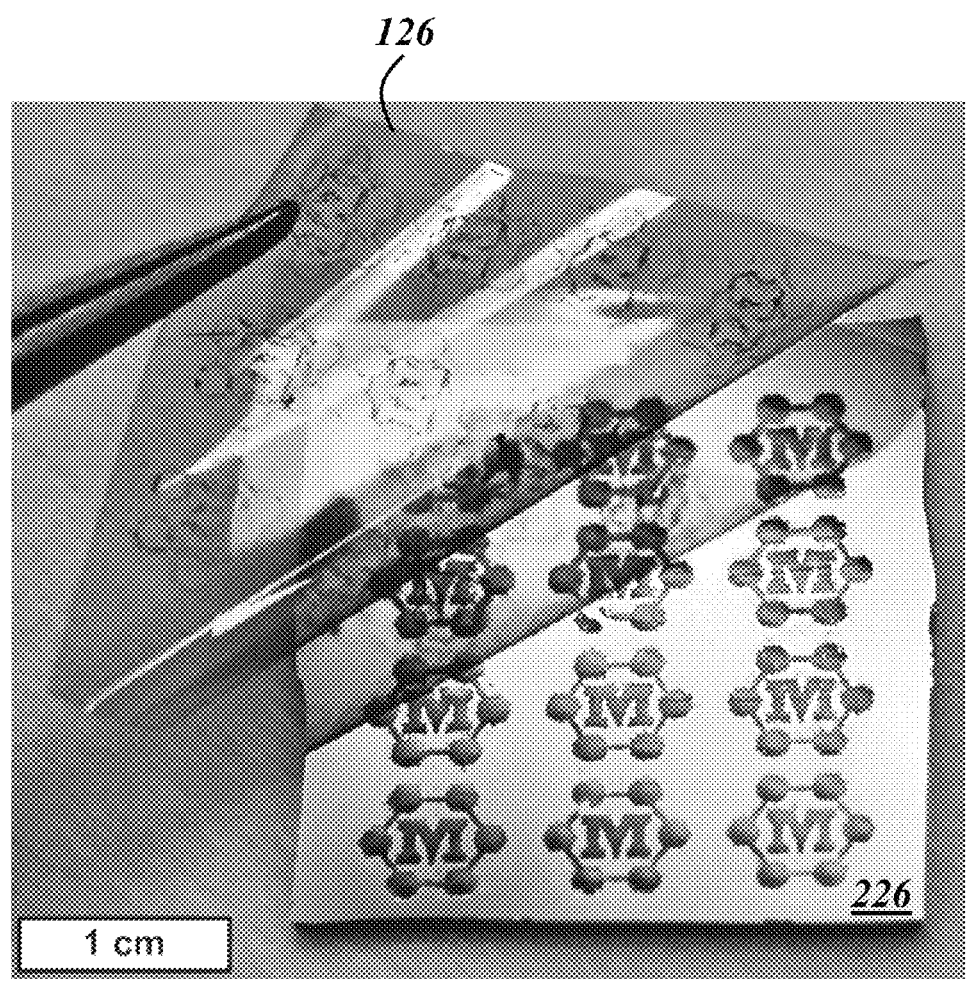
FIG. 7 is a photographic image of a transfer substrate being peeled away from a growth substrate, with toner in a growth pattern transferred from the transfer substrate to the growth substrate.

After printing, each Kapton sheet substrate 126 was cut from its paper backing with a razor blade and placed on a growth substrate 226 with the deposited toner facing toward the growth substrate for transfer of the MICR toner pattern as depicted in FIG. 6. The growth substrate 226 was a silicon (Si) wafer coated with 300 nm of thermally grown $SiO_2$ and a 10 nm layer of $Al_2O_3$ deposited by e-beam evaporation. A 5 mm insulating layer 70 was placed on top of the Kapton sheet, and an 800-gram aluminum block was placed on top of the insulating layer to press the Kapton film against the Si-wafer. The insulating layer 70 in this example was a silicone foam layer, but other suitable insulating layer materials could be used. The aluminum block 72 could also be replaced by any load (F) application mass or device. This stack of materials was placed on a 150° C. hotplate 74 for six seconds, then removed and allowed to cool to room temperature. Other heat sources 74 could be used. The Kapton film 126 was peeled away from the silicon substrate 226, leaving behind the patterned toner, as shown in the photograph of FIG. 7.

Figure 8:
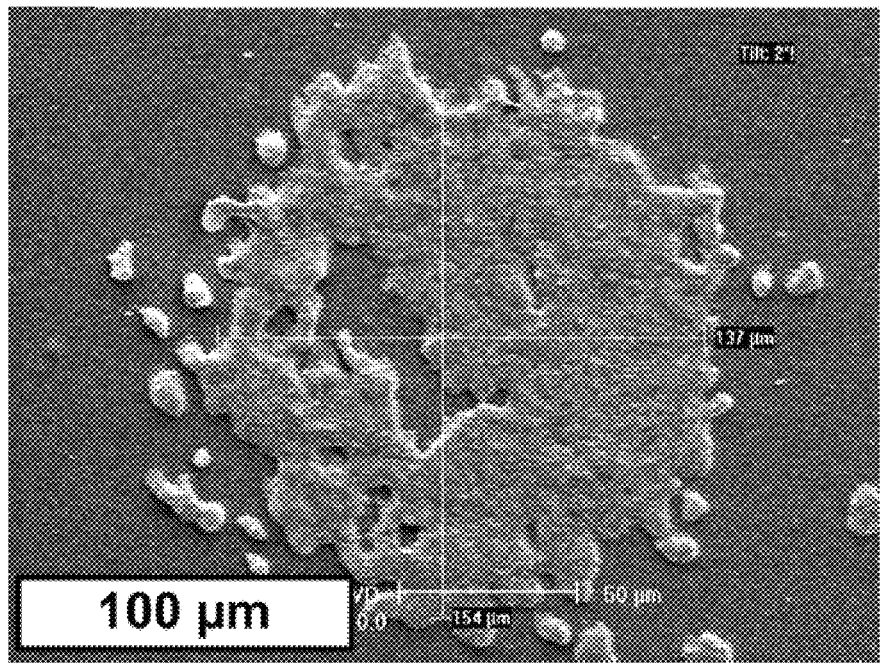
FIG. 8 is an SEM image of a toner dot as printed on the transfer substrate.
Figure 9:
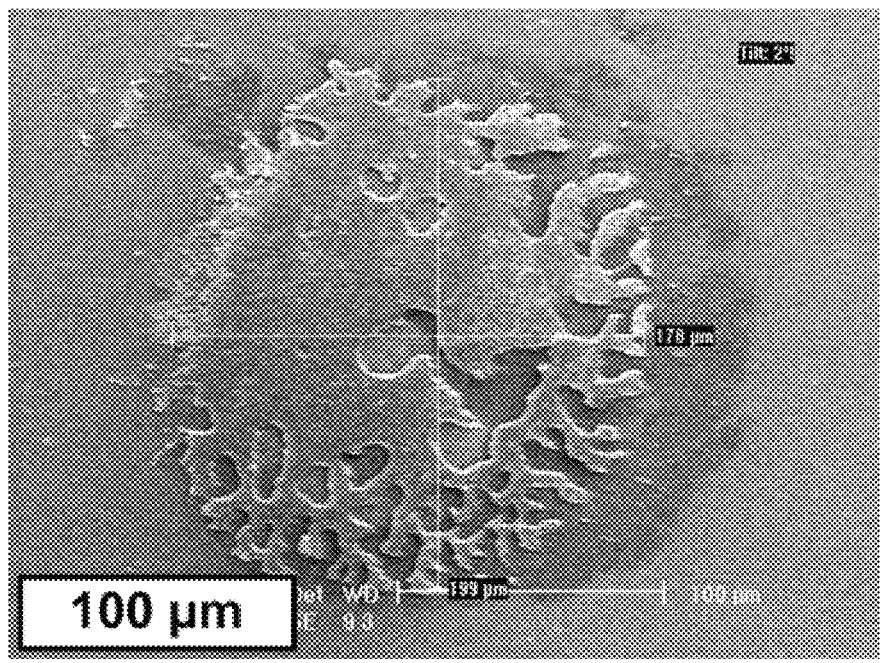
FIG. 9 is an SEM image of a toner dot transferred to the growth substrate.
Figure 10:
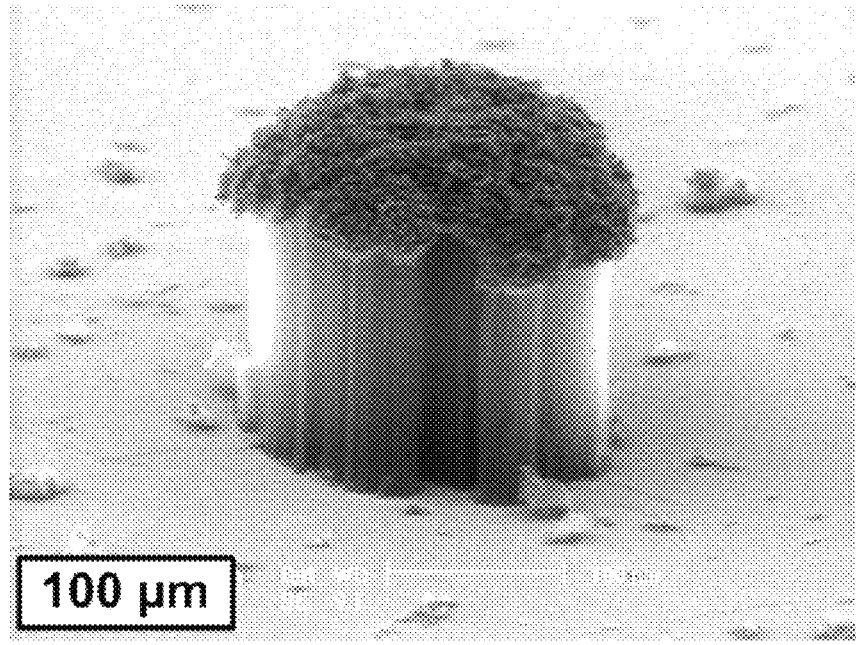
FIG. 10 is an SEM image of a micropillar CNT forest grown from a toner dot.
Figure 11:
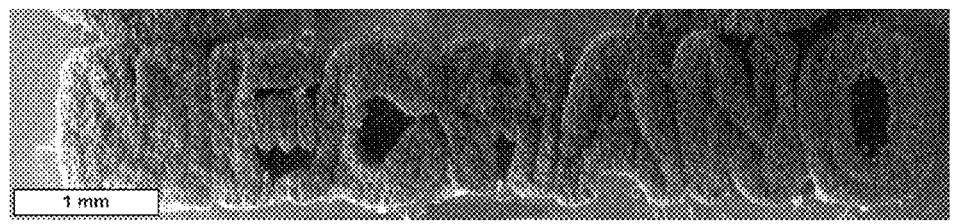
FIG. 11 is a top view of a centimeter-scale patterned forest grown from a pattern of deposited catalyst.

Vertically-aligned (VA) CNT forests were then grown on the growth substrate from the transferred catalyst pattern using a CVD process in a standard tube furnace. FIG. 8 is an SEM image of a single toner dot on the Kapton transfer substrate before the transfer process, FIG. 9 is an SEM image of a single toner dot on the growth substrate after the transfer process, FIG. 10 is an SEM image of a VACNT forest (in the form of a micropillar) grown from a transferred toner dot, and FIG. 11 is a photograph of CNT growth from a large-scale growth pattern. As shown in FIG. 10, VACNT forests were successfully grown on individual dots of the deposited pattern in the form of micropillars. As shown in FIG. 11, bundles of VACNT forests were successfully grown on a centimeter-scale from deposited and transferred catalyst patterns. The bundle of VACNT forests shown in FIG. 11 may also be referred to as a patterned forest, in which the forest is an organized grouping of smaller individual forests or a continuous forest arranged along the growth substrate in the desired pattern. CNT forests were grown to heights up to about 400 μm. SEM analysis revealed that a single toner dot of the pattern increased in area by about 63% when measured before and after the transfer process. This may be due to the binder component of the toner flowing under the applied heat and force. Thus, the smallest feature created in this particular example of the method is larger than the smallest feature the printer is normally capable of printing.

As shown in FIG. 10, CNT forests grown from the MICR toner include an unusually rough crust layer at the top of the forest. This may be due to the polydisperse particle size distribution of iron oxide particles in the MICR toner. The larger particles may not support CNT growth, resulting in the formation of carbon "onions," in which multiple layers of carbon are deposited around the catalyst particles when subjected to the CNT growth atmosphere. However, unlike typical carbon onions, these carbon layers were composed primarily of amorphous carbon, as determined by SEM-EDS analysis. These larger particles were lifted by the CNTs during growth to form the rough crust at the top of the forests. In one embodiment, the first set of CNT forests (or other nanostructures) can be removed from the substrate, thereby removing the larger catalyst particles then present in the crust. Since these forests were not grown to termination, and the growth morphology was base-growth, removal of the initially-grown forests would leave only the smaller catalyst particles on the substrate behind, enabling subsequent growth of additional CNT forests on the substrate to yield forests with more uniform tangled CNT crusts. Adjustment of the toner density can also reduce the thickness of the crust, such that only the quantity of nanoparticle catalyst necessary to grow the CNT forest would be printed, either directly to the growth substrate or to the transfer substrate.

Figure 12:
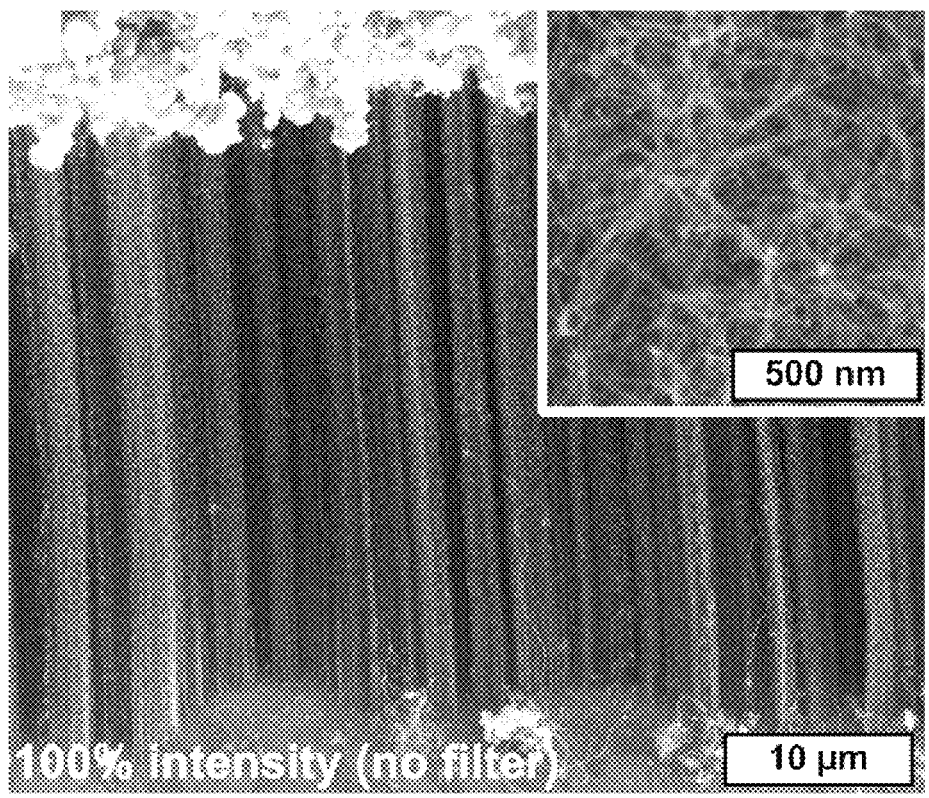
FIG. 12 is an SEM image showing a side view of a CNT forest grown from a toner pattern.
Figure 13:
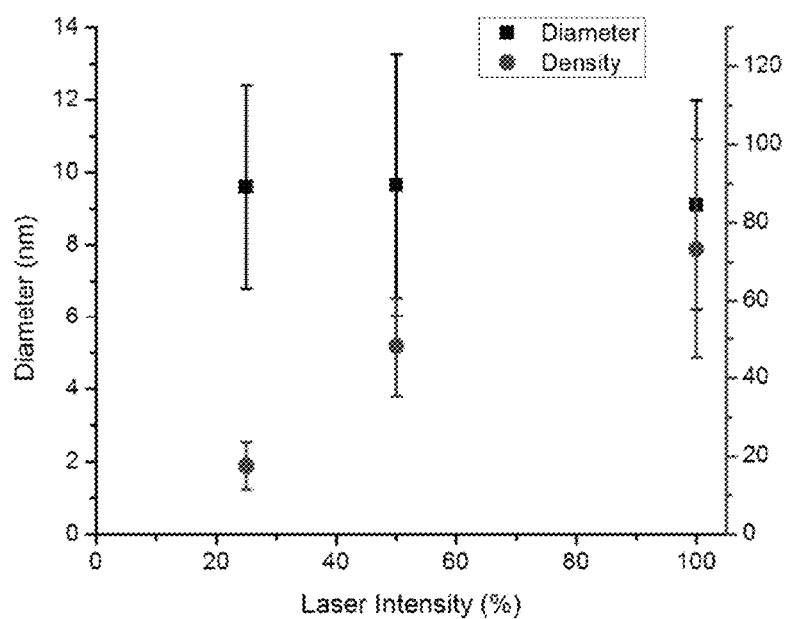
FIG. 13 is a chart showing CNT diameter and CNT forest density as a function of laser intensity.

FIG. 12 is an SEM image showing vertical alignment of the individual nanostructures of the synthesized CNT forests. Similar aligned growth and crust morphology was observed for catalyst patterned with laser intensity ranging from 25-100% of the available intensity. The density of the CNTs within the forests was a function of laser intensity, independent of the areal dimensions, height, and crust characteristics. The chart of FIG. 13 illustrates the relationship between forest density and the intensity of the laser used in the printing process. As laser intensity is increased, forest density (plotted as circles along the right-hand y-axis) is increased. This may be due to a larger number of catalyst particles being deposited onto the transfer substrate at higher laser intensity due to the higher charge imparted on the printer drum surface, thus increasing the available growth sites for CNTs. The CNT diameter distribution was measured using small angle x-ray scattering (SAXS). By fitting the SAXS data, it was determined that the increase in forest density with increasing laser intensity was not due to larger diameter CNTs, as the average diameter of the CNTs (plotted as squares along the left-hand y-axis) at the various laser intensities was very similar.

Figure 14:
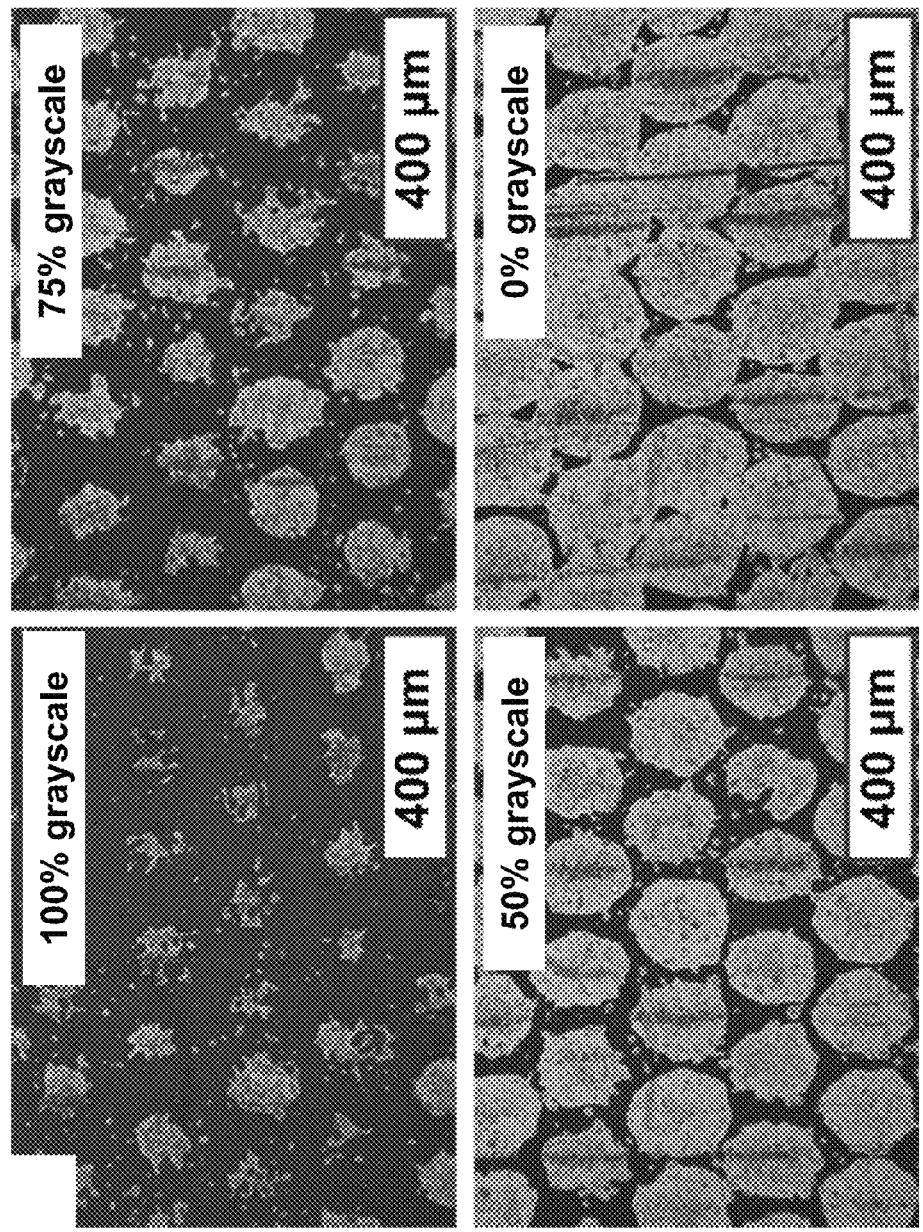
FIG. 14 includes images illustrating patterned toner at various grayscale levels.
Figure 15:
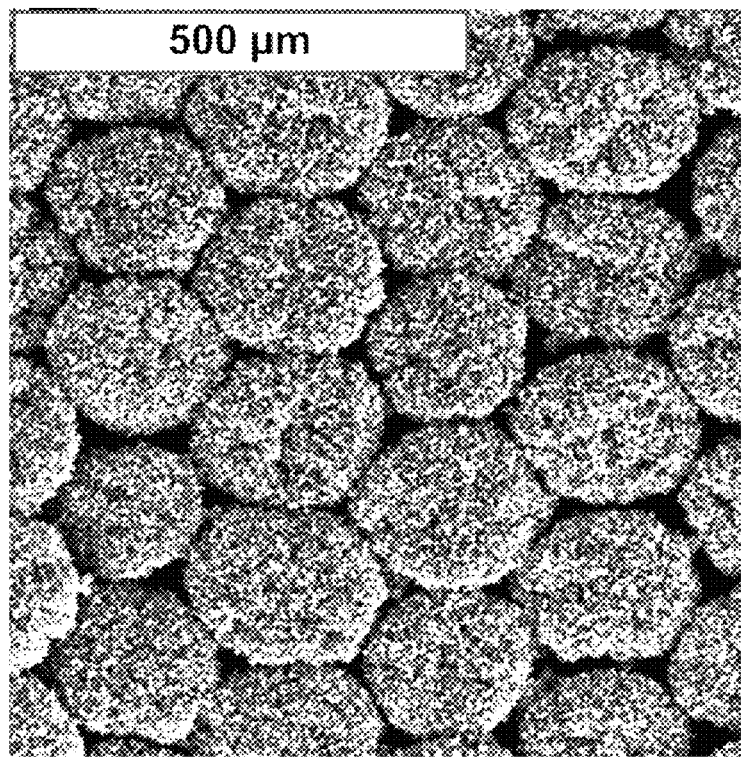
FIG. 15 is an SEM image and top view of micropillar CNT forests grown from individual grayscale dots of toner.
Figure 16:
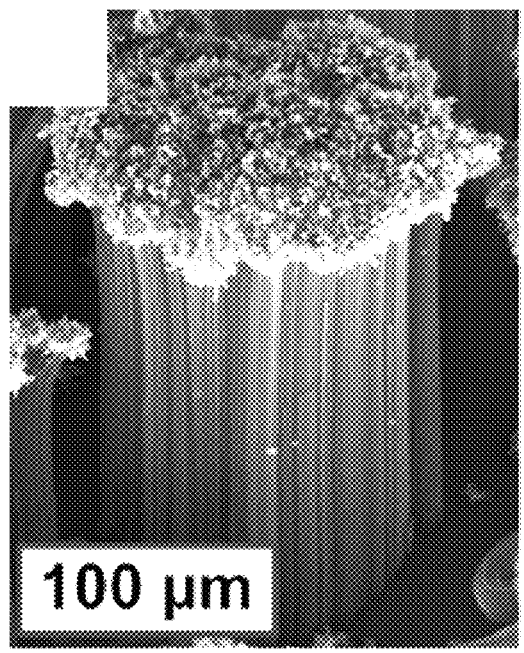
FIG. 16 is an SEM image of a micropillar forest from an individual grayscale dot.

Printing of grayscale patterns resulted in growth of regularly spaced micropillar arrays, with each grayscale dot forming an individual pillar. The general technique for grayscaling includes filling a particular print area with a mixture of deposited toner and open space. The toner is deposited in dots or spots, and increasing the grayscale level decreases the size of the toner dots, thus increasing the open space between them, as shown in FIG. 14. Upon exposure to the nanostructure growth environment each dot of the grayscale pattern produced a pillar forest with a diameter of approximately 150 μm. FIG. 15 is a top view of a plurality of pillar VACNT forests (i.e., a patterned forest) produced from a grayscale pattern, and FIG. 16 is an image of an individual VACNT forest produced from a single grayscale dot.

Figure 17:
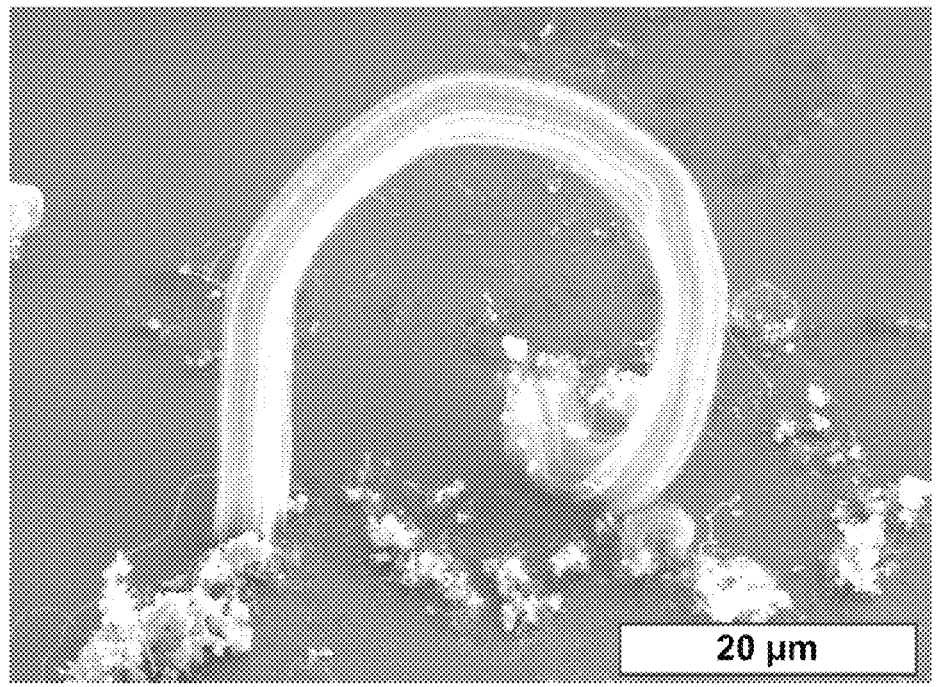
FIG. 17 is an SEM image of a CNT forest grown from a relatively small MICR particle.
Figure 18:
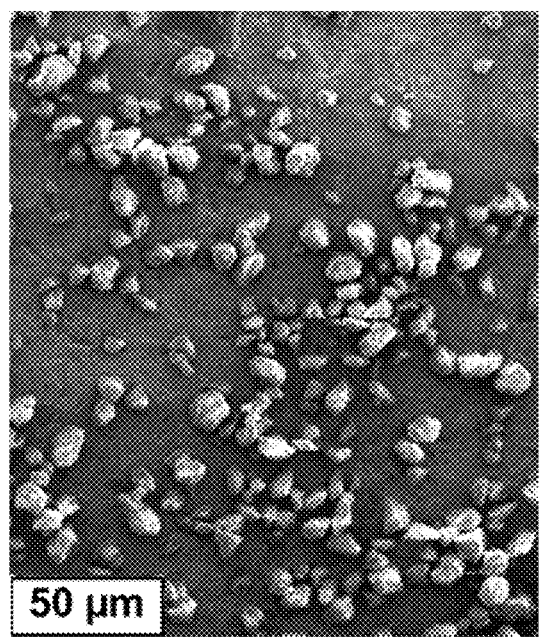
FIG. 18 is an SEM image of commercially available MICR toner particles harvested from a toner cartridge.
Figure 19:
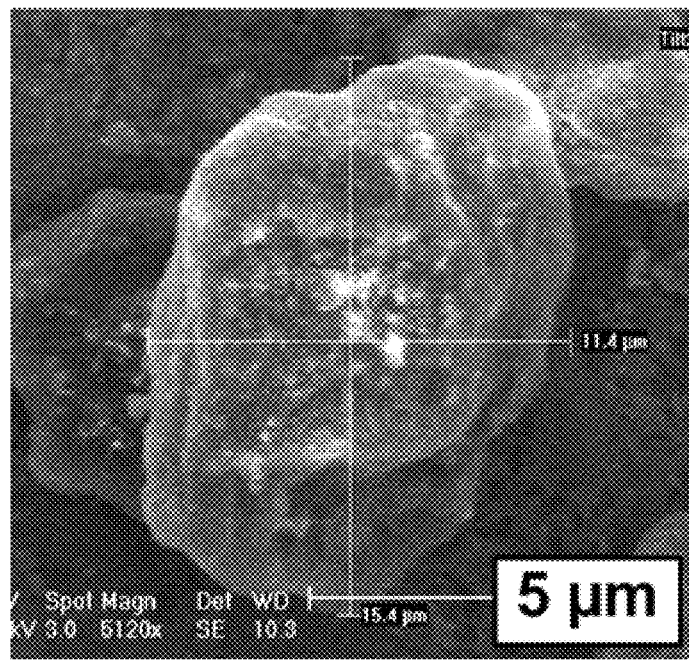
FIG. 19 is an SEM image of an individual MICR toner particle.

The laser printer used in these experimental examples had a maximum printable resolution of 70-200 μm based on the entire range of experiments conducted for this study. However, observation around the perimeter of printed patterns revealed stray MICR toner particles on the order of about 5 μm that also produced CNT forests, as shown in FIG. 17. This indicates that the smallest printable dot size is not the smallest possible CNT feature size that can be made using MICR toner or other catalyst-containing particles. A laser printer or other electrostatic deposition printer with improved resolution that allows for printing of finer patterns could also allow for smaller features comprising nanostructures. Other improvements can be made, as well. For example, if the printer resolution is sufficiently increased, the limiting variable for the smallest feature size could be the size of the deposited particles. FIG. 18 is an SEM image of MICR toner particles harvested from the toner cartridge used in this example. The smallest particle was about 15 μm in diameter, as shown in FIG. 19. Smaller particle size could also lead to smaller CNT feature size. The composition of the MICR toner particles was determined to be about 43% iron oxide.

Figure 20:
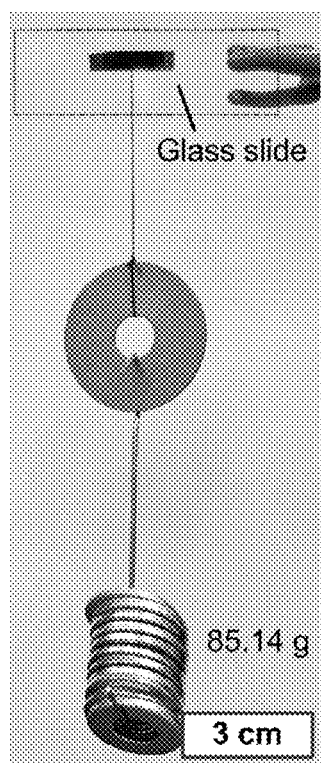
FIG. 20 is a photographic image of a test set-up used to measure adhesive strength of a patterned CNT forest in shear.
Figure 21:
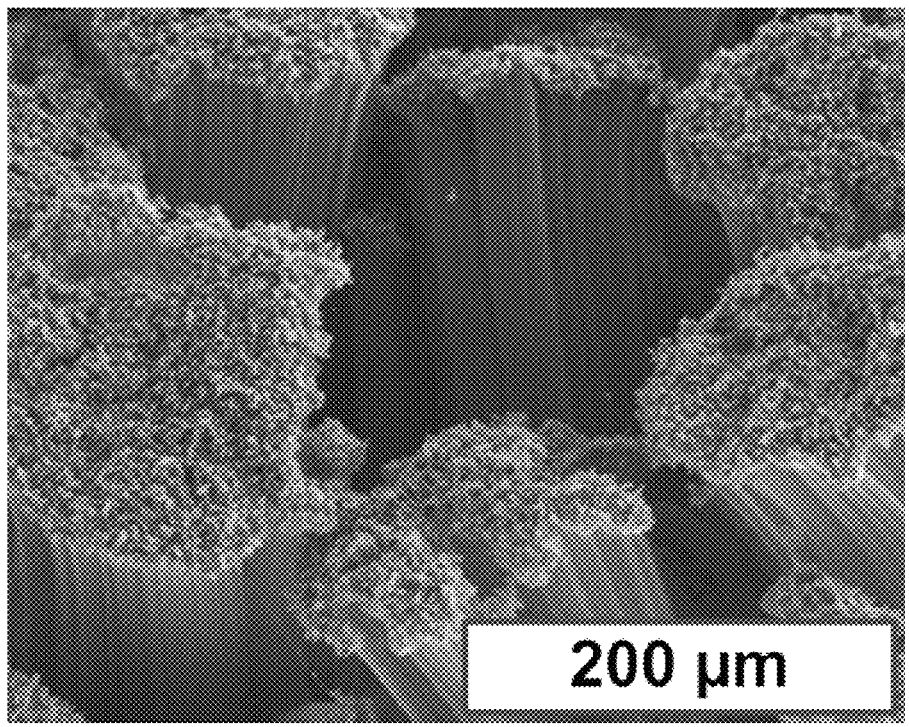
FIG. 21 is an SEM image of a patterned CNT forest prior to adhesion testing.
Figure 22:
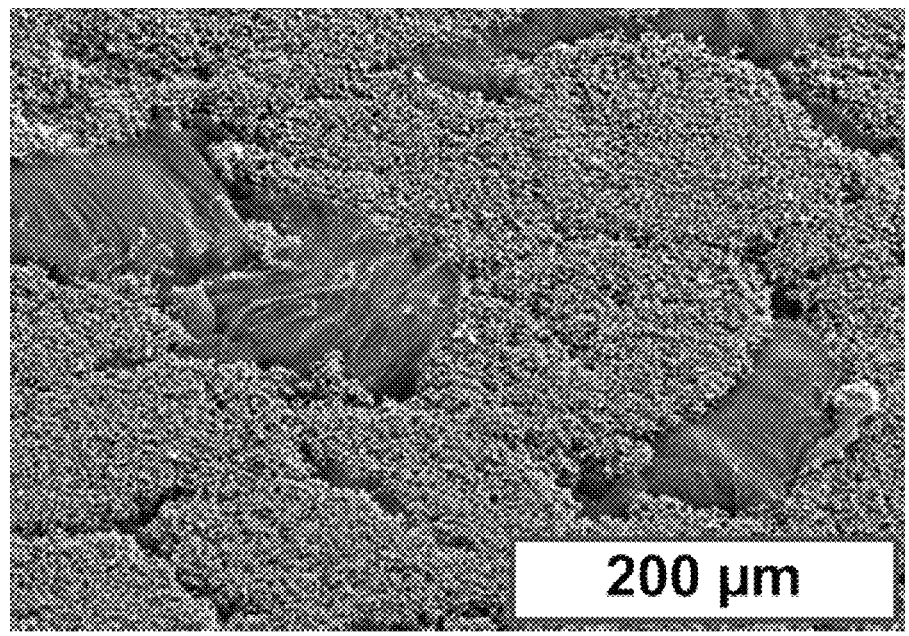
FIG. 22 is an SEM image of the patterned CNT forest of FIG. 21 after adhesion testing.

Additional experiments were performed to study the dry adhesive properties of CNT forests grown from laser printed catalyst. A growth pattern was printed using MICR toner, 50% laser intensity, and a grayscale gradient that transitioned from no toner to full black. A patterned CNT forest was grown using the above-described printing, transfer, and CVD processes. A clean glass microscope slide was pressed on top of the patterned forest with finger pressure. The substrate and glass slide surfaces were oriented vertically, and weight was hung from the growth substrate by a thread to place the dry-adhesive joint in shear. The weight was increased until failure occurred, and the final stable weight was recorded. The test set-up is shown in FIG. 20. The patterned forest supported 85.14 grams, or a shear stress of about 1.271 $N/cm^2$. The patterned forest was examined after testing. The area corresponding to the lighter grayscale pattern exhibited partial delamination, while the full-black region exhibited no delamination. Additionally, the compression of the nanostructures when the glass was pressed on top of the patterned forest resulted in a matrix of horizontally aligned CNTs, with CNT sidewalls aligned with the substrate and glass surfaces and the top crust of the forest dispersed along the interface with the glass slide. FIG. 21 is an SEM image of the patterned CNT forest before the glass slide was pressed over it, and FIG. 22 is an SEM image of the patterned CNT forest after adhesion testing. Given the increase in exposed CNT sidewalls due to the conversion to horizontally aligned CNTs in the lighter patterns, the CNT sidewalls, rather than the crust, likely provided the bulk of the adhesion strength. The increased van der Waals forces between the substrate and the CNTs of sparser, smaller pillars may yield increased adhesive properties.

Figure 23:
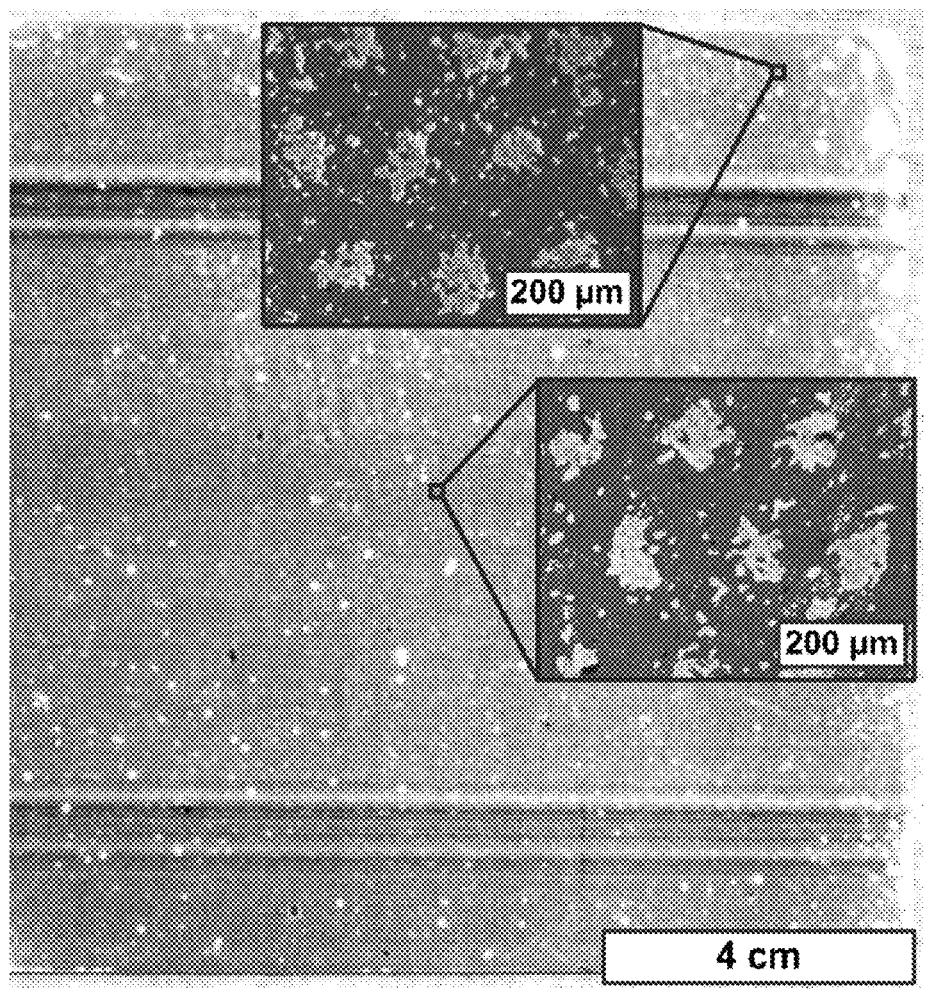
FIG. 23 includes photomicrographs of the surface of an alumina substrate, including a pattern of toner transferred to the substrate surface.

In order to illustrate the potential scalability of this method of catalyst patterning, a large area transfer was successfully conducted. A 114 mm square, 50% grayscale pattern was printed onto a Kapton transfer substrate, and then transferred to an alumina sheet that could be used as a growth substrate. Photomicrographs of the alumina surface are shown in FIG. 23. The patterned toner was locally uniform, but there were some inconsistencies in the overall pattern. Striations due to excess toner on the photosensitive printer drum were present, along with voids in the pattern where air bubble entrapment between the Kapton sheet and the substrate occurred. Fortunately, each of these issues can be overcome with additional controls in the process, and this proof-of-concept unlocks the potential for high-throughput, roll-to-roll patterning of CNT catalyst for industrial applications such as composite laminates, engineered surfaces, and energy storage devices.

Figure 24:
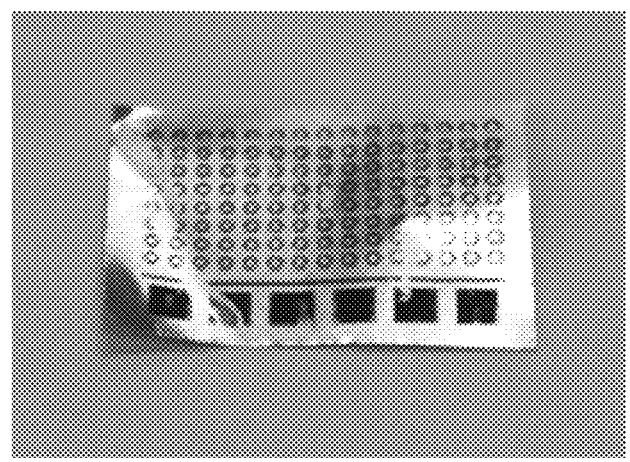
FIG. 24 is a photographic image of a growth pattern deposited on a stainless steel substrate.

In another proof-of-concept example, a growth pattern was printed directly onto a metal substrate. FIG. 24 is a photographic image of MICR toner printed directly onto a stainless steel sheet in a desired growth pattern. Other metal substrate materials are possible.

Experimental Details and Equipment

The VACNT arrays were grown in a Lindberg Blue M horizontal tube furnace with a 25 mm OD quartz tube (22 mm ID, 300 mm heated length) at atmospheric pressure, with flows of 400/100/100 sccm $He/H_2/C_2H_4$, at 775° C. for 15 min, preceded by an annealing step at 775° C. for 10 min with flows of 100/400 sccm $He/H_2$. The samples were rapidly cooled in the growth atmosphere before purging the CVD chamber with He when the thermocouple reading dropped below 250° C.

For the adhesion testing, a two-part epoxy was used to attach a piece of thread to the back of the growth substrate, and the other end of the thread was tied around a washer. Using IPA, a glass microscope slide was wiped clean and pressed onto the CNT growth by hand with finger pressure. The slide was mounted in a ring clamp with the washer hanging on the thread so that the sample was loaded in shear. A metal hanger was hooked on the washer that allowed additional washers to be added to increase the shear load on the sample. The sample was loaded until failure occurred, and the final stable weight was recorded.

Mass measurements of the substrates were collected before and after MICR transfer to the substrate, and again after CNT growth, using an Ohaus Discovery microbalance. The difference between the measurements before and after MICR transfer was multiplied by the percent value of iron oxide in the toner that was obtained through TGA to obtain the mass of the nanostructure catalyst. Subtracting the mass of the catalyst and the mass of the bare substrate from the sample mass with CNT growth represented the mass of CNTs grown on the substrate. The areal coverage of each VACNT array was calculated using contrast pixel counting in Adobe Photoshop CS6, using images taken by a Nikon D40 camera. SEM imaging was performed using a FEI Nova Nanolab, and forest heights were measured directly from SEM images at different magnifications. The combination of the mass, area and height measurements was used to calculate the areal and volumetric densities of the VACNT arrays. For X-ray scattering measurements, the CNT forest was placed on a motorized stage in the beam path of the G1 beamline at Cornell High Energy Synchrotron Source (CHESS). A beam energy of $10\pm0.1$ keV (wavelength≈0.13 nm) was selected with synthetic multilayer optics (W/B4C, 27.1 Å d-spacing), and the beam was focused down to ≈20 μm using mechanical slits upstream. The beam size was measured by scanning the beam over a pinhole slit mounted on a motorized stage while measuring the beam intensity. The downstream X-ray intensity measurements were normalized to the upstream measurements in order to eliminate the effect of the drift in synchrotron intensity with time. The Beer-Lambert Bouguer law was applied to calculate the mass density of each slice in the CNT forest, based on the total mass attenuation coefficient of carbon (graphite) at the X-ray energy of 10 KeV ($\approx 3$ cm$^2$/g). A standard sample of silver behenate powder ($d_{001}$=58.380 Å) was used to calibrate the pixel-to-q ratio. Linescans from the 2D SAXS patterns were fitted using a mathematical model for lognormally distributed hollow cylinders. These scans were obtained by integration of intensities within ±10° from the reference direction (x-axis) of the inverse space parameter q (chosen to be the direction of maximum intensity). The fitting code used an iterative approach in searching for the best fit within a user-defined fitting range. By including the low q part of the data, a good fit was achieved that selects a probability density function (PDF) for diameter distribution as well as for the ratio c=ID/OD, where ID is the inner diameter of the multi-walled CNT and OD is the outer diameter of the multi-walled CNT.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method, comprising the step of: depositing particles comprising a nanostructure catalyst onto a substrate in an electrostatically defined growth pattern, wherein the substrate is a transfer substrate and the method further comprises the step of transferring at least a portion of the particles to a growth substrate.

2. The method of claim 1, further comprising the step of: growing nanostructures from the particles.

3. The method of claim 2, wherein the nanostructures are carbon nanotubes.

4. The method of claim 2, wherein the nanostructures are generally vertically aligned with respect to the substrate.

5. The method of claim 2, wherein the method is a continuous process comprising:
  depositing, by an electrostatic printing device, the particles onto a continuous sheet of moving substrate;
  transferring at least some nanostructure catalyst from the continuous sheet of moving substrate to a different continuous sheet of moving substrate; and
  routing the different continuous sheet of moving substrate through a nanostructure growth device to grow the nanostructures.

6. The method of claim 1, wherein the method includes depositing, by a laser printer, the particles onto the substrate.

7. The method of claim 1, wherein only a portion of the particles are transferred to the growth substrate during the step of transferring and the method further comprises transferring another portion of the particles to a different growth substrate.

8. The method of claim 1, wherein the nanostructure catalyst comprises iron, cobalt, nickel, a transition metal oxide, or any combination thereof.

9. The method of claim 1, wherein the particles are deposited in the form of magnetic ink character recognition toner or ink.

10. A method, comprising the steps of:
  (a) pressing a mixture comprising a nanostructure catalyst and a binder against a substrate; and
  (b) growing nanostructures from the mixture,
  the method further comprising heating the mixture to increase the temperature of the binder during step (a), wherein pressing the heated mixture to the substrate bonds the mixture to the substrate, and
  further wherein, in step (a), the mixture is pressed against the substrate by a heated roller.

11. The method of claim 10, further comprising the step of:
  transferring at least some of the mixture from a transfer substrate to a growth substrate, wherein the nanostructures are grown on the growth substrate.

12. The method of claim 11, wherein the substrate of step (a) is the transfer substrate and the step of transferring is performed between steps (a) and (b).

13. The method of claim 11, wherein the substrate of step (a) is the growth substrate and the step of transferring is performed before step (a).

14. The method of claim 11, further comprising the steps of:
  removing the nanostructures from the growth substrate; and
  growing more nanostructures from the mixture.

15. The method of claim 11, wherein the nanostructure catalyst is in the form of nanoparticles having a generally uniform particle size.

16. The method of claim 11, further comprising the steps of:
 defining a nanostructure growth pattern; and
 printing the pattern onto the substrate, wherein particles comprising the mixture are deposited onto the substrate in the form of ink or toner.

\* \* \* \* \*